July 31, 1956 — G. A. CHEREM — 2,756,784
TREE PRUNER AND TRIMMER BASED ON PORTABLE PLATFORM
Filed March 5, 1954 — 2 Sheets-Sheet 1

INVENTOR.
GABRIEL A. CHEREM
BY
Robert A. Sloman
ATTORNEY

July 31, 1956 G. A. CHEREM 2,756,784
TREE PRUNER AND TRIMMER BASED ON PORTABLE PLATFORM
Filed March 5, 1954 2 Sheets-Sheet 2

INVENTOR.
GABRIEL A. CHEREM.
BY
Robert A. Sloman
ATTORNEY.

United States Patent Office 2,756,784
Patented July 31, 1956

2,756,784

TREE PRUNER AND TRIMMER BASED ON PORTABLE PLATFORM

Gabriel A. Cherem, Detroit, Mich.

Application March 5, 1954, Serial No. 414,461

4 Claims. (Cl. 143—43)

This invention relates to a telescoping tree pruner and trimmer, and more particularly, to a portable mechanism which is power-operated and which is adapted to facilitate pruning and trimming of trees.

It is the object of the present invention to provide a portable power-operated tree trimmer which facilitates the trimming of high branches in trees and in bushes without climbing.

It is the further object of the present invention to provide a telescopically mounted trimming head mounted upon the end of the extensible pruning device.

It is the further object of the present invention to provide a means for pivotally mounting the pruning device and to facilitate angular positioning thereof.

It is the further object of the present invention to provide a vertically adjustable trimmer head, upon which is mounted a circular saw, a chain saw, a drill chuck, as well as a power take-off mechanism.

It is the further object of the present invention to provide a novel clutch mechanism for transmitting rotative power from an engine to the trimming head of the present device.

These and other objects will be seen from the following specification and claims, in conjunction with the appended drawings, in which:

Figure 3:
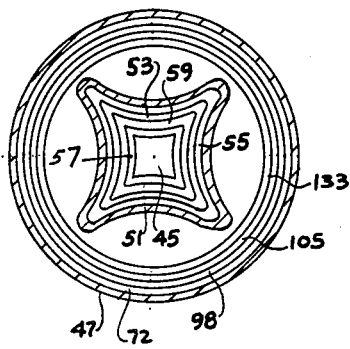
Fig. 3 (sheet 1) is a section upon an enlarged scale taken on line 3—3 of Fig. 1.

It will be understood that the above drawings illustrate merely a preferred embodiment of the invention, and that other embodiments are contemplated within the scope of the claims hereafter set forth.

Referring to the drawings, the present tree trimmer and tree pruning device consists of a base 11, which may be a part of a vehicle, or be secured thereto.

Mounted upon base 11 is a platform 12, and positioned upon said platform is a formed bracket 13, whose base 14 is secured to platform 12 by the screws or other fasteners 15.

The bolt 16 extends down through bracket 13, platform 12 and the base 11, and is secured by the nut 17, whereby platform 12 may be swivelled throughout 360 degrees, if desired.

The bracket 13 at its opposite ends has a pair of semicircular formations which terminate in the outwardly projecting flanges 22. Upon each of the flanges 22, there is positioned the semi-circularly shaped caps 18, which also have outwardly projecting flanges 21, and which flanges are secured to flanges 22 by the bolts and nuts 23, or equivalent fastener.

A gear housing is provided, which includes a pair of oppositely arranged plates 24 and 25, which have marginal flanges 26 and 27 interconnected and secured together by the bolts and nuts 28 and 29 to thereby complete the gear casing.

Upon opposite ends of said casing and projecting outwardly therefrom are the circular sleeves 30, which are rotatively positioned within the bracket elements 13 and 18, which receive the same and upon tightening of the bolts 23 may be secured in the desired angular position.

Positioned within the sleeves 30 upon opposite ends of said casing are a pair of thrust bushings 31 and 33 with annular flanges 32, which bear against the interior wall of the gear casing.

Driven shaft 34 extends through bushings 31 and 33 and through the gear casing 24—25, and secured to said shaft within said casing as at 36 is a bevel gear 35.

Figure 1:
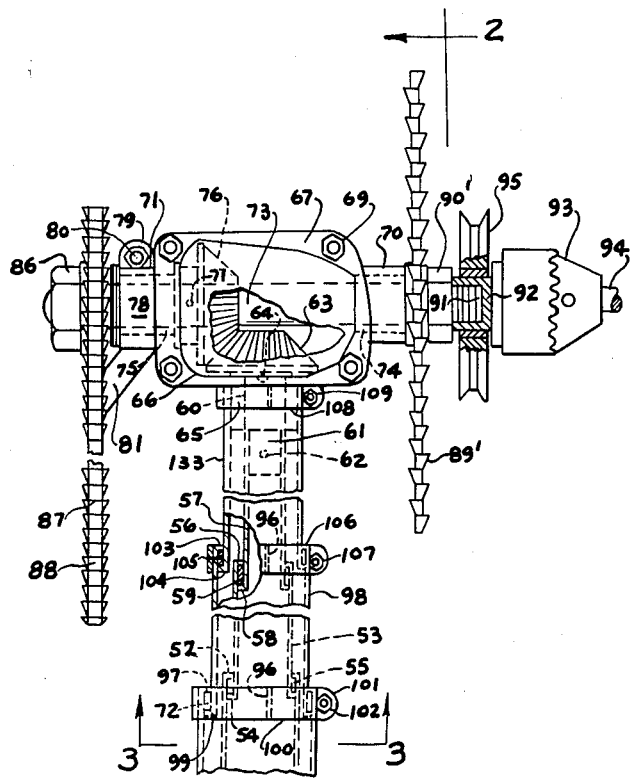
Fig. 1 is a partially broken away and sectioned elevational view of the present tree trimming device.
Figure 1:
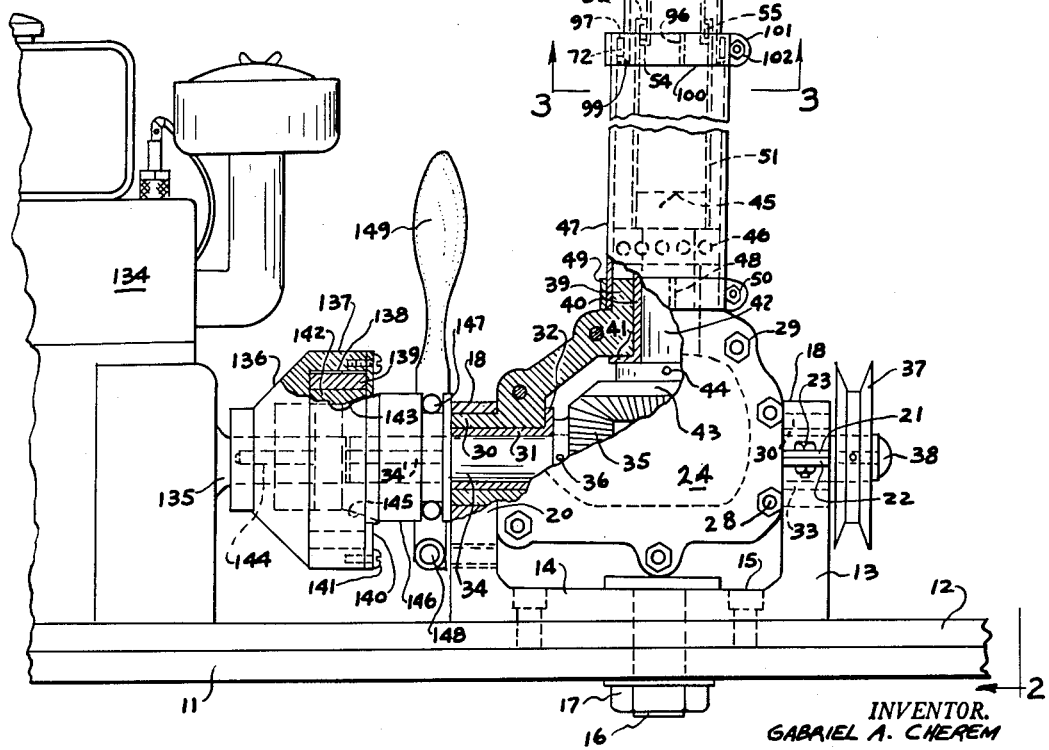

Shaft 34 extends from said casing as shown in Fig. 1, and has secured thereto as at 38 the power take-off pulley 37.

Casing 24—25 has a transversely arranged sleeve portion 39, within which is positioned the thrust bushing 40 having at one end a flange 41, which bears against the interior surface of said casing. Shaft 42 is journaled through said bushing and carries at its inner end within said casing bevel gear 43 secured thereto at 44 and in mesh with bevel gear 35.

Shaft 42 extends above said casing through the bearings 46 mounted within the sleeve 47 and terminates in the squared end 45, which is snugly positioned within the lower-most drive tube 51 of a series of telescoping tubes for transmitting rotative power thereto.

The outer tube 47 is split at its lower end at 48, and is rotatably positioned upon the sleeve 39 of said casing and is secured in any desired position of rotated adjustment by the clamp or lock strap 49 bolted as at 50.

The hollow drive shaft 51 receives at its lower end the substantially squared end 45 of the driven shaft 42, which projects from the gear casing. Telescoping hollow drive shaft 53 of reduced diameter slidably extends within the hollow tube 51 and its outer surface is slidably engaged by the inwardly directed annular flange 52 upon the upper end of tube 51. The lower end of tube 53 has an outwardly projected flange 54 and between the two flanges 52 and 54, there is provided a bushing 55 which preferably may be brass and which facilitates telescoping movement of tube 53.

Tube 53 is broken away in Fig. 1, for illustration, however the upper end thereof slidably receives telescoping tube 57, the lower end of which has an outwardly directed flange 58, which slidably engages the interior surface of drive tube 53. The upper end of tube 53 has an inwardly directed flange 56, which slidably engages tube 57, there being a suitable bushing 59 interposed between flanges 56 and 58.

The upper end of tube 57 extends as at 60 within the depending sleeve portion 65 of a second gear casing 66. Shaft 61 is secured to the top tube 57 as at 62, extends up into casing 66, and has secured thereto upon the interior of said casing as at 64, the bevel gear 63.

Said gear casing includes a pair of registering flanges 67 and 68 forming the opposed halves of said casing, and which are secured together by the bolts 69. Projecting from opposite ends of said casing and forming a part thereof, are the sleeves 70 and 71, within which are positioned suitable bushings 74 and 75. Extending through said bushings is a shaft 73 carrying upon the interior of casing 66, bevel gear 76 secured to said shaft at 77 and in mesh with bevel gear 63.

Mounted upon sleeve 71 at one end of said casing is a bracket or clamp 78 which has a pair of registering split elements 79 secured by the bolt 80 to thereby set said clamp in any desired position of angular adjustment. Extending from said clamp is a supporting arm 81, to the outer end of which is secured the elongated mounting plate 82 for the chain saw 87. Fasteners 84 extend from clamp plate 81 and are adjustably positioned through the elongated slots 83 in plate 82.

Sprocket gear 85 is mounted upon the outer portion of shaft 73 and is secured in position by the nut 86, said sprocket gear being adapted to receive one end of the continuous sprocket chain 88 to the elements of which are secured a continuous series of formed outwardly projecting saw blade elements 87.

Plate 82 carries at its outer end as at 90 a second sprocket 89 or other guide element for supportably receiving the outer end of the sprocket chain 88, to provide for continuous movement thereof.

By this construction, the upper gear casing 66 forming a part of the present pruning device, is adapted to support the elongated chain saw 87 which may be adjusted at any desired angle and secured in position with respect to gear housing 66.

Upon the opposite end of shaft 73 as at 91, there is secured an adaptor sleeve 92 upon which is mounted the drill chuck 93 for carrying the drill bit 94 fragmentarily shown.

Power take-off pulley 95 is supportably secured to adaptor 92 for rotation therewith. The circular saw 89' is carried upon shaft 73 adjacent pulley 95 and is secured with respect to said shaft by the nut 90', Fig. 1. Outer casing tube 47 at its upper end is partially split as at 96, and is adapted to slidably receive therein the telescoping tube 98. The lower end of tube 98 has an outwardly directed flange 99, which slidably engages the inner surface of tube 47. The upper end of tube 47 has an inwardly directed flange 97, which engages tube 98, there being a suitable bushing 72 interposed between flanges 97 and 99 to facilitate telescoping movements of tube 98.

In the desired position of adjustment of tube 98 with respect to tube 47, there is employed a locking clamp 100 of circular shape with registering wings 101 joined together at 102. The upper end of tube 98 has an inwardly directed annular flange 103, which slidably receives telescoping tube 133, the lower end of which has an outwardly directed flange 104. A suitable bushing 105 is interposed between said flanges to facilitate telescoping relative movements between tubes 133 and 98. Tube 98 is split at its upper end as at 96 to facilitate the clamping of the two tubes together in adjusted position as by the circular locking clamp 106, which is secured together as by the bolt 107.

The upper end of tube 133 is received by the sleeve portion 65 of the upper gear casing 66 and is clamped thereon by the locking strap 108 and its locking screw 109.

By this construction, the upper gear casing 66 is mounted in adjustable position upon the upper end of a series of telescoping tubes, such as the tubes 47, 98 and 133.

It is contemplated that any desired number of such tubes could be employed.

Positioned within the guide tubes are a series of telescoping drive tubes 51, 53 and 57, which are arranged in interlocking driving relation and preferably have a form which is substantially square in cross section.

In the preferred embodiment of the invention shown in Fig. 3, the drive tubes 51, 53 and 57 have outer walls, which are slightly concave to thereby establish an improved driving relation between said tubes and in order to better withstand the torque.

Figure 2:
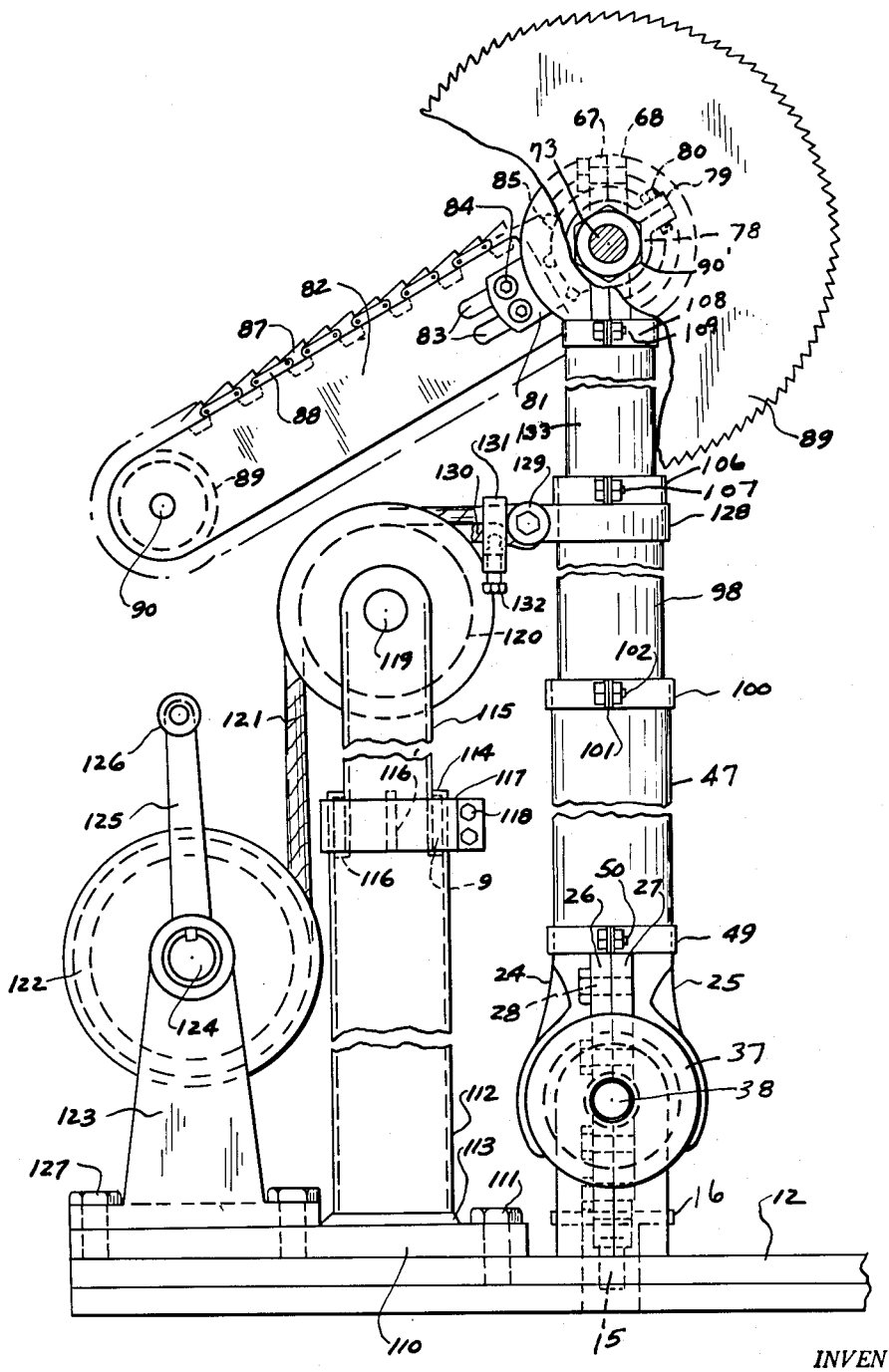
Fig. 2 is a section taken on line 2—2 of Fig. 1.

As shown in Fig. 2, there is provided a secondary platform 110 secured at 111 to platform 12, and upon which is mounted the upright tubular standard 112 secured to platform 110 as at 113, by welding or otherwise.

The upper end of standard 112 has an inwardly directed flange 114 which receives the vertically adjustable tube 115, whose lower outwardly projected flange 116 slidably bears against the interior surface of standard 112. Between the flanges 114 and 116, there is provided a suitable bushing 9. The upper end of standard 112 is split as at 116'. Lock strap 117 is arranged upon the upper end of standard 112 and is adapted to secure tube 115 in vertically adjusted position by means of the bolts 118.

Journaled upon the upper end of tube 115 as at 119 is a pulley wheel 120 over which extends a cable or rope 121, the lower end of which is wound around the drum 122 journaled at 124 upon the drum housing 123, which is in turn secured to platform 11 as by the bolts 127. A crank 125 is secured to said drum and carries a handle 126 at its outer end for permitting manual rotation of drum 122.

The outer end of cable 121 extends around the fitting 129 of clamp 128, which is secured to an intermediate portion of telescoping tube 98 and is further clamped to itself as at 130 by the additional clamp 131 with lockscrew 132, for illustration.

Inasmuch as the gear casing 24—25 is swively mounted within the bracket 13 for rotation about the axis of shaft 34, there is provided a convenient method of tilting the present trimming device to any desired angle. To facilitate this tilting and for maintaining the telescoping tubes in the desired position, there is employed the present cable drum 122 in conjunction with the guide pulley 120, whereby the trimming device may be angularly raised and lowered as desired.

Instead of the drum and pulley arrangement, it is contemplated that the pivotal angular adjustment of the telescoping tubes may be achieved by any other equivalent structure, as for example, a hydraulic cylinder.

For illustration, there is shown in Fig. 1, upon or adjacent platform 12 a motor 134 with drive shaft 135, which is secured by key 144 to clutch housing 136, which has an annular casing 137 and an internal bore 138 adapted to loosely receive a plurality of arcuate shoes 139, which are preferably three in number and each extend throughout 120 degrees.

Said shoes are retained within clutch housing 137 by the end plate 140 and the securing screws 141. There are provided within said clutch housing a series of circularly spaced shoe cams 142 which are adapted to operatively engage the shoes 139 for expanding the same into operative frictional engagement with the clutch housing 136—137.

To effect this expansion, there is provided a spool 146, which is slidably keyed as at 34' upon shaft 34. Said spool has a tapered surface 145, which is adapted for operative engagement with corresponding tapered surfaces 143 of the shoe cams 142. In order to effect movement of the spool 146 to the left to establish a driving relation between said spool, said clutch housing and shaft 34, there is provided an operating arm 149 which has a stirrup formation or fork 147 which extends over said spool, the lower ends of said fork being pivotally connected as at 148 to a portion of the formed bracket 13. Pivotal movement to the left of handle 149 will establish a driving relation to shaft 34, which through gears 35 and 43 will drive the telescoping drive tubes 51, 53 and 57 for in turn driving shaft 73 which carries the saws 87 and 87'. Movement to the right of handle 149 will disengage said clutch.

It is contemplated that the present tree pruner and trimmer could be employed as a single stage tool for trimming low hedges. For this purpose, the saw blades would be removed and a propeller type of blade substituted. A device for this purpose could be made small enough and be attached to a commercial lawn mower.

Having described my invention, reference should now be had to the claims which follow for determining the scope thereof.

I claim:

1. A tree trimmer comprising a platform, an upright bifurcated mounting bracket secured to said platform, a pair of horizontally aligned journals within said bifurcations, a first gear housing movably positioned within said bracket, aligned outwardly projecting sleeves at opposite ends of said gear housing rotatably mounted within said journals, said gear housing having a drive shaft projecting horizontally outward through said sleeves adapted for connection to a power source and a driven shaft projecting outwardly and upwardly from said gear housing intermediate said sleeves, a series of telescopically arranged guide sleeves with the lower end of the lowermost of said sleeves secured to said gear housing axially of its driven shaft, a second gear housing adjustably spaced above said first gear housing and including a drive shaft projecting outwardly and downwardly therefrom and a right angularly rotated driven shaft projecting outwardly therefrom adapted to carry a chain saw, the upper end of the uppermost of said guide sleeves being secured to said second gear housing axially of its drive shaft, thereby providing a telescoping boom for said saw, and a series of rotatable telescopically aligned tubes within and coaxial of said sleeves slidably engaging each other in driving relation with the lower end of the lowermost of said tubes secured to the driven shaft of said first gear housing and with the upper end of the uppermost tube secured to the drive shaft of said second gear housing.

2. The tree trimmer of claim 1, the adjacent ends of adjacent guide sleeves having oppositely directed annular flanges for slidably engaging the surfaces of an adjacent guide sleeve, the adjacent ends of adjacent tubes having oppositely directed annular flanges for slidably engaging the surface of an adjacent tube, and annular guide bushings interposed between adjacent pairs of said flanges, said guide sleeves loosely surrounding said telescoping tubes.

3. The tree trimmer of claim 1, the adjacent ends of adjacent guide sleeves having oppositely directed annular flanges for slidably engaging the surfaces of an adjacent guide sleeve, the adjacent ends of adjacent tubes having oppositely directed annular flanges for slidably engaging the surface of an adjacent tube, annular guide bushings interposed between adjacent pairs of said flanges, said guide sleeves loosely surrounding said telescoping tubes, the opposite ends of said guide sleeves being longitudinally split adjacent their ends, and a series of longitudinally spaced clamp straps at the ends of said guide sleeves for securing said sleeves to said gear housings, respectively, and for securing said sleeves in the desired longitudinally adjusted relation with respect to each other.

4. The tree trimmer of claim 1, a rotatable adjustable mounting bracket secured to one end of said second gear housing axially of its driven shaft, a drive sprocket secured upon said latter driven shaft adjacent said bracket, an elongated saw mounting plate joined to said bracket and arranged at right angles to said latter driven shaft, a sprocket chain guide journaled upon the outer end of said saw plate in alignment with said first sprocket, a sprocket chain mounted over said saw plate and extending around said sprocket guide, and a series of oppositely directed saw elements secured to and projecting from opposite sides of said sprocket chain.

References Cited in the file of this patent

UNITED STATES PATENTS

| | | |
|---|---|---|
| Re. 16,478 | Jacobson | Nov. 16, 1926 |
| 1,221,723 | Guichard | Apr. 3, 1917 |
| 1,316,743 | Roche et al. | Sept. 23, 1918 |
| 1,364,432 | Georgelis | Jan. 4, 1921 |
| 1,462,764 | Nyquist et al. | July 24, 1923 |
| 1,472,394 | Holt | Oct. 30, 1923 |
| 1,592,656 | Corona | July 13, 1926 |
| 1,602,357 | Georgelis | Oct. 5, 1926 |
| 1,844,113 | Beidler et al. | Feb. 9, 1932 |
| 2,158,444 | Wardle | May 16, 1939 |
| 2,299,129 | Dickenson et al. | Oct. 20, 1942 |
| 2,462,314 | Fuqua | Feb. 22, 1949 |
| 2,504,880 | Rittenhouse | Apr. 18, 1950 |
| 2,662,562 | Lindell | Dec. 15, 1953 |
| 2,664,119 | Spearman | Dec. 29, 1953 |

FOREIGN PATENTS

| | | |
|---|---|---|
| 84,732 | Switzerland | Apr. 16, 1920 |
| 118,817 | Australia | Aug. 14, 1944 |